United States Patent [19]

Verlinden et al.

[11] Patent Number: 5,771,090
[45] Date of Patent: Jun. 23, 1998

[54] IMAGE RECORDING APPARATUS COMPRISING AN IMAGESETTER AND A VERTICAL PROCESSOR

[75] Inventors: Bartholomeus Verlinden, Tongeren; Patrick Van den Bergen, Berchem; Jan Claes, Mortsel, all of Belgium

[73] Assignee: Agfa-Gevaert N.V., Mortsel, Belgium

[21] Appl. No.: 643,797

[22] Filed: May 7, 1996

[30]   Foreign Application Priority Data

May 20, 1995 [EP]  European Pat. Off. ............. 95201330

[51] Int. Cl.⁶ ............................. G03B 27/00; G03D 3/08
[52] U.S. Cl. .......................... 355/27; 347/260; 396/622; 396/624; 396/630
[58] Field of Search .................................. 396/548, 564, 396/612, 614, 622, 624, 626, 630, 636; 355/27, 28; 347/155, 228, 257, 259, 260, 262, 264

[56]             References Cited

U.S. PATENT DOCUMENTS

| | | | |
|---|---|---|---|
| 3,943,539 | 3/1976 | Bown et al. ............................. | 396/614 |
| 4,166,689 | 9/1979 | Schausberger et al. ................. | 396/614 |
| 4,178,089 | 12/1979 | Spence-bate ............................. | 396/624 |
| 4,260,234 | 4/1981 | Burton ..................................... | 355/28 |
| 4,311,379 | 1/1982 | Falomo ................................... | 396/612 |
| 4,987,438 | 1/1991 | Goto et al. .............................. | 396/626 |
| 5,107,296 | 4/1992 | Ozawa et al. ............................. | 355/28 |
| 5,175,583 | 12/1992 | Noh et al. ................................ | 347/262 |
| 5,283,157 | 2/1994 | Davies ..................................... | 430/233 |
| 5,345,870 | 9/1994 | Bailey et al. ............................. | 355/85 |
| 5,347,337 | 9/1994 | Patton et al. ............................. | 396/622 |
| 5,374,972 | 12/1994 | Nakane et al. .......................... | 396/612 |
| 5,404,187 | 4/1995 | Sterflinger ............................... | 347/263 |
| 5,468,588 | 11/1995 | Macioch et al. ........................ | 430/229 |
| 5,541,042 | 7/1996 | Ura et al. ................................. | 396/612 |

FOREIGN PATENT DOCUMENTS

| | | |
|---|---|---|
| 410500A1 | 1/1991 | European Pat. Off. . |
| 483415A1 | 5/1992 | European Pat. Off. . |

*Primary Examiner*—A. A. Mathews
*Attorney, Agent, or Firm*—Baker & Botts, L.L.P.

[57]                ABSTRACT

Apparatus for exposing and processing a photographic recording material, generally called imaging element, comprising (i) an exposing part, generally called imagesetter, in which the imaging element is imagewise exposed, and (ii) a processing part, generally called processor, in which the imaging element is wet processed, characterized in that the exposed imaging element is fed automatically from the imagesetter into the processor and in that the processing is carried out along a substantially vertical path. Also disclosed is a method for recording an image by using the above described apparatus for exposing and processing an imaging element.

12 Claims, 11 Drawing Sheets

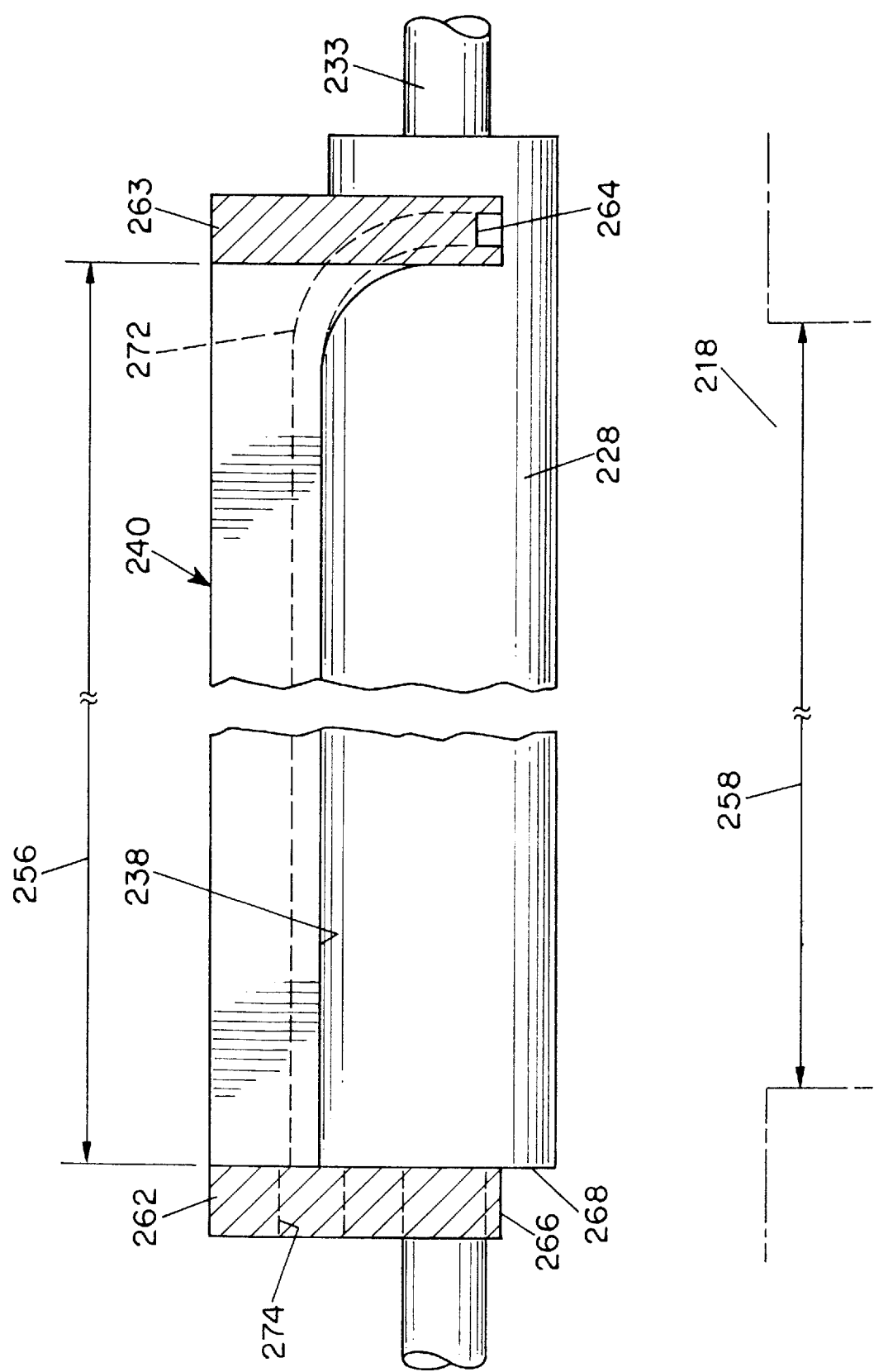

IMAGE RECORDING APPARATUS COMPRISING AN IMAGESETTER AND A VERTICAL PROCESSOR

FIELD OF INVENTION

The present invention relates to a system for imagewise exposing photographic recording materials, generally called "imaging elements", and wet processing exposed photographic materials, sometimes called "imaged elements", in one apparatus. More particularly the invention relates to improvements in apparatus in which an imaging element is exposed in an exposing part, generally called "imagesetter" (e.g. a high-resoluble photographic laser printer), and immediately thereafter transported automatically through a processing part, generally called "processor".

BACKGROUND OF THE INVENTION

According to a first type of image recording systems, an image is recorded by first imagewise exposing an imaging element in an exposing part, being e.g. a camera or an imagesetter (such as e.g. REPROMASTER or DUPLIPHOT, both known from Agfa-Gevaert). After exposure, the imaging element is taken out by an operator from said exposing part, generally in a darkroom, and then processed in a photographic processor to yield the final image. This conventional way of producing an image on an imaging element offers many disadvantages, such as a cumbersome and significantly labour-intensive procedure.

According to a second type of image recording systems, in order to avoid the necessity of working in a darkroom, film handling systems are available wherein the imaging element is loaded in a light-tight cassette (such as known e.g. in medical radiography). Here, the imaging element may be introduced in normal daylight into the exposing part (as the imaging element is included in a light-tight cassette) and, after exposure, may be removed (within the light-tight cassette) in normal daylight from the exposing part and may be introduced in normal daylight into a photographic processor. In order to further reduce the necessity of a labour-intensive procedure, and also to increase the productivity, so-called "on-line processing imagesetters" were developed (see FIGS. 1 & 2; to be discussed later on in the detailed description of the present application), such as e.g. Agfa ACCUSET or Agfa SELECTSET (both manufactured and marketed by Agfa-Gevaert). Thus, according to a third type of image recording systems, an "external bridge" allows to dock an imaging element directly from the imagesetter into the processor. Such an on-line bridge allows for unattended operation, thereby reducing labor costs and increasing productivity.

According to a fourth type of image recording systems, an "internal bridge" design (see FIG. 3; also to be discussed later on in the detailed description) integrates the film transport within the apparatus itself and passes the imaging element directly from the exposing part into the processor (e.g. Agfa AVANTRA 44 OLP). This further reduces excessive floor space taken up by an external bridge. Yet, the remaining floor space taken up by the total apparatus, including exposing part and processing part, might be reduced further.

Common to all foregoing types of image recording systems, within the processor, the imaging element is transported along a generally horizontal feed path, thereby occupying a substantial amount of floor space. Thereabove, the imaging element passes from one treating unit to another usually via a circuitous feed path passing under the surface of each treatment liquid and over dividing walls between the treating units. In such a circuitous feed path also a supplementary danger of scratching the imaging element, especially on an emulsion side of the imaging element, is inherently present. Moreover, the attendant who is stationed at the inlet where successive imaging elements enter the exposing part of the image recording apparatus is incapable of monitoring the outlet because the latter is located at a substantial distance from the inlet. (As an illustrative but practical example, in FIG. 2 a distance of about 3 meter is indicated.)

Processing machines having a vertical orientation have been proposed in U.S. Pat. No. 4,166,689 (Schausberger et al. assigned to Agfa-Gevaert), in which a plurality of treating units are mounted one above the other. However, no combination of a vertical processor with an imagesetter, no integration within, nor application as an image recording apparatus, has been mentioned, nor has been indicated. Thereabove, such a combination or an integration would be extremely difficult, as a processor according to U.S. Pat. No. 4,166,689 has no gastight characteristics, so that vapour from a processing liquid and/or drying heat could penetrate in the imagesetter with possibly disturbing influences on the quality of the system.

OBJECTS OF THE INVENTION

A first object of the invention is to provide an image recording apparatus comprising an imagesetter and an integrated vertical processor, wherein the apparatus occupies only a fraction of the floor space which is commonly occupied.

It is a second object of the present application to provide an image recording apparatus with a novel and improved vertical processor.

It is still a further object of the present invention to provide an advantageous method for recording an image carried out by exposing and wet processing an imaging element.

Further objects and advantages of the present invention will become clear from the description hereinafter.

SUMMARY OF THE INVENTION

The present invention provides an apparatus as set out in the claims.

The present invention also provides a method for recording an image by using the herein described apparatus for exposing and processing an imaging element.

BRIEF DESCRIPTION OF THE DRAWINGS

The application will be described hereinafter by way of examples with reference to the accompanying drawings, which are not necessarily to scale. Herein:

FIG. 16 is a side view of part of the sealing support and one roller taken in the direction 16—16 in FIG. 11.

DETAILED DESCRIPTION OF THE INVENTION

The description given hereinbelow mainly comprises five chapters, namely (i) basic components of relevant apparatus used in the present application, especially of the exposing part or imagesetter; (ii) basic components of the processing part or processor used in the present application; (iii) a complete imagesetting system with both integrated imagesetter and integrated processor as used in the present invention; (iv) preferred embodiments for making a lithographic printing plate according to the present invention; (v) further applicability of the present invention.

First Attention is Given to Basic Components of Relevant Apparatus, Especially of the Exposing Part or Imagesetter.

Many components and functions of the present invention may be introduced more gently by starting from a concise summary of the basic state of the art, as it was already indicated in the background section of the application.

Figure 1:
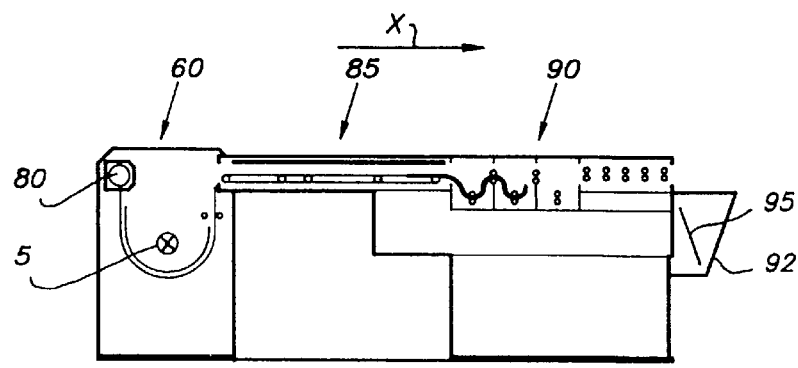
FIG. 1 is a longitudinal section of an imagesetter linked via an external bridge to a horizontal processor, according to prior art.
Figure 2:
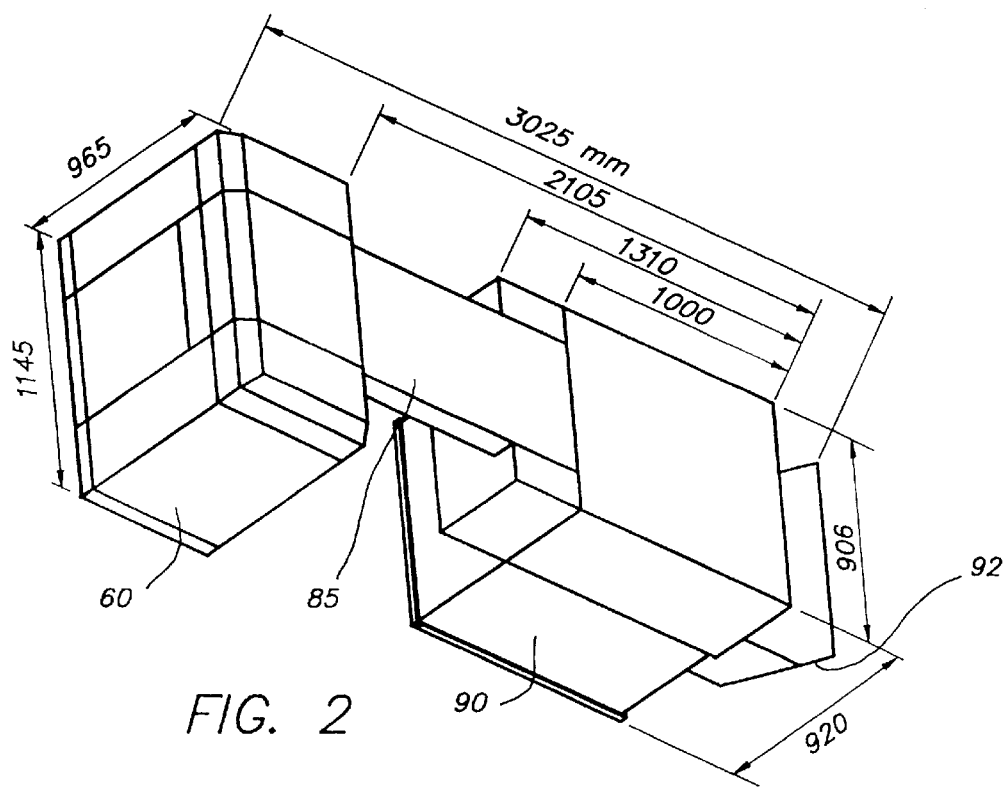
FIG. 2 is a perspective view of an imagesetter linked via an external bridge to a horizontal processor, according the prior art.

Referring to FIG. 1, an apparatus embodying the state of the art relative to the present invention includes an exposing part 60 and a processing part 90, disposed side by side and interconnected by a bridging part 85. Specifically, in the exposing part 60 an imaging element 5, e.g. a photographic film or paper in the form of a roll, is placed in a magazine 80 (e.g. with a 60 meter supply) and positioned at an exposure stage. The photographic material 5 thus exposed with the image is separated into individual images with a cutter (not shown in this drawing), and is fed to the processing part 90. The photographic material thus developed in the processing part 90 is then ejected to a print outlet 92. Numeral 95 denotes photographic prints thus ejected into print outlet 92. FIG. 2 is a perspective view of an imagesetter 60 linked via an external bridge 85 to a horizontal processor 90, according to prior art. Attention may be drawn on the main dimensions of a prior art system (for film widths up to 720 mm), which amounts circa 920 mm×1145 mm×3025 mm.

Figure 3:
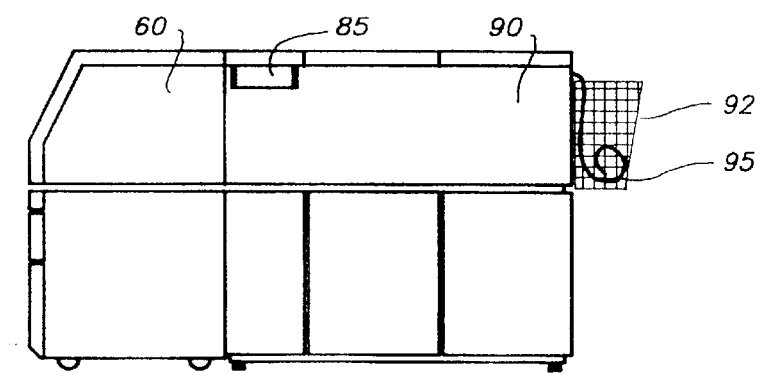
FIG. 3 is a longitudinal view of an imagesetter linked via an internal bridge to a horizontal processor, according to prior art.

In addition to FIGS. 1 and 2, FIG. 3 gives a longitudinal view of an imagesetter 60 linked via an internal bridge 85 to a horizontal processor 90, according to prior art. Herein, like reference numerals indicate like parts, so that no explanation has to be duplicated.

Now, an image recording apparatus with integrated vertical processor according to the present invention will be described in detail with reference to the attached drawings.

First, attention is given to the exposure system itself and to its application in imagesetting systems.

Figure 4:
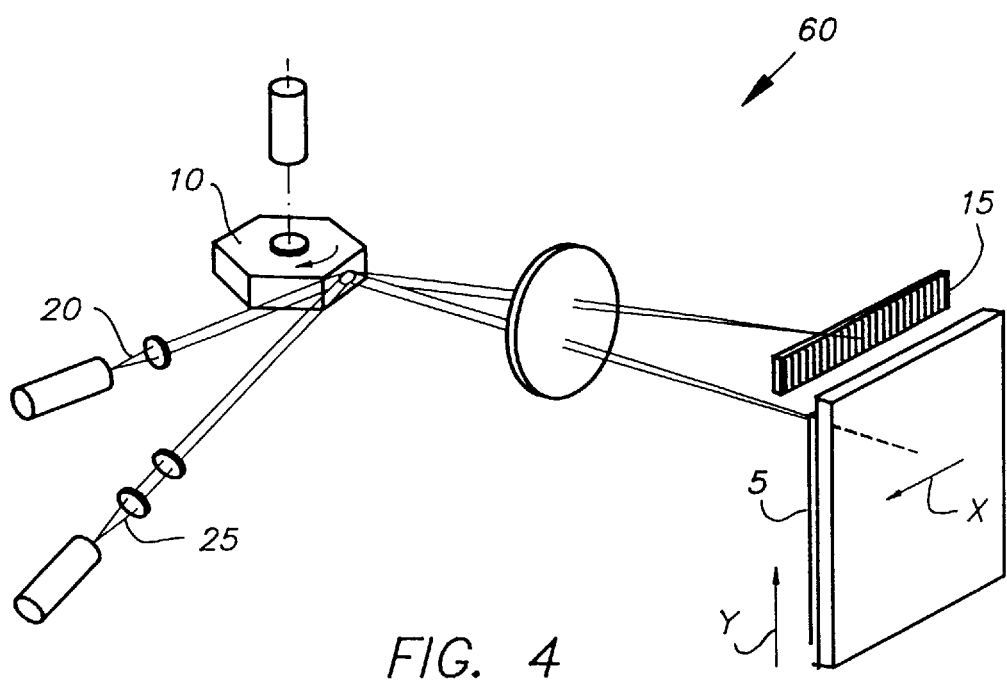
FIG. 4 schematically shows a flat bed type exposing device for use in a method according to the present invention.
Figure 5:
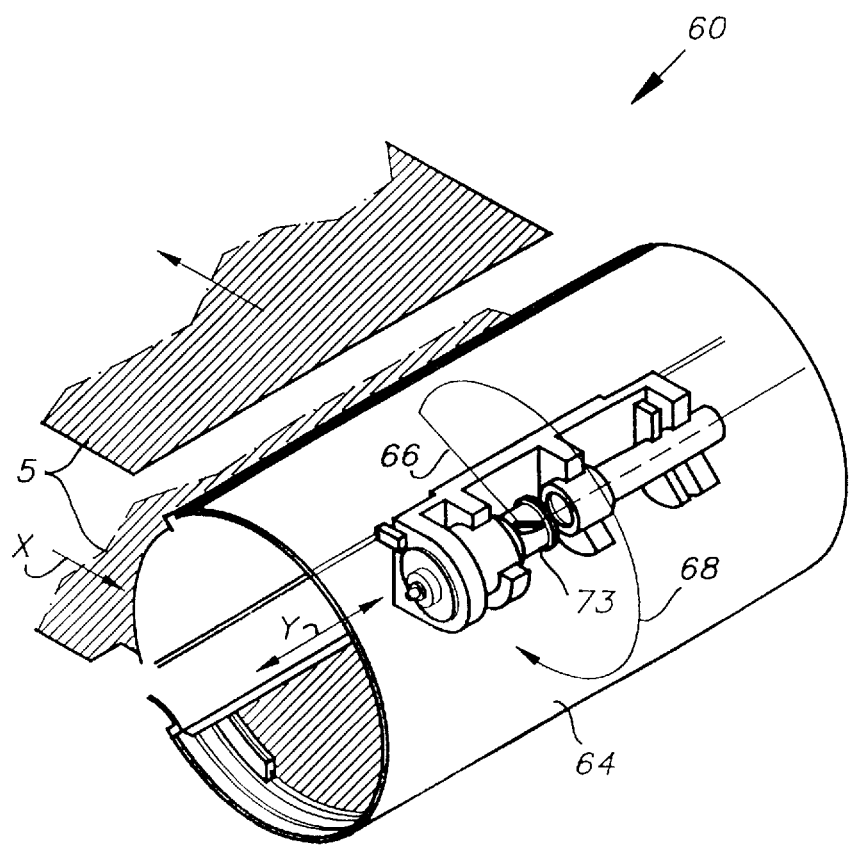
FIG. 5 shows main parts and main movements of an internal drum type exposing device for use according to the present invention.

FIG. 4 schematically shows a flat bed type exposing device for use according to the present invention; whereas FIG. 5 schematically shows an internal drum type exposing device for use according to the present invention. In these figures and in also in other figures (as e.g. FIG. 6), equivalent parts are designated by like reference numerals.

The exposing part 60 generates a modulated writing light beam 20 having a wavelength to which an imaging element 5 is sensitive and directs the writing light beam 20 to a moving mirror 10 to cause the writing light beam 20 to scan across the surface of the imaging element 5 in a first scanning or main scanning direction X. A reference light beam 25 is generated and directed to the moving mirror 10 simultaneously with the writing light beam 20 to cause the reference light beam 25 to scan across the surface of a light detecting element 15 in the first scanning direction X. Since the writing light beam 20 and the reference beam 25 are both deflected by the same moving mirror 10, the reference beam 25 falling on the light detecting element 15 causes the generation of synchronising signals indicative of the position of the writing light beam 20 on the surface of the imaging element 5. The writing light beam 20 is modulated and the imaging element 5 is moved in a second scanning or subscanning direction Y in response to the synchronising signals generated by the light detecting element 15. In this manner any imperfections in the surface of the moving mirror 10, or in its movement, are accounted for.

The writing light beam 20 is modulated as the scanning process proceeds, in order to imagewise expose the imaging element 5. The reference light beam 25 is not modulated, but is of constant intensity.

In a drum type scanning device (either internal drum, or external drum) said reference beam is usually replaced by an encoding-and-coding system. For sake of simplicity, in FIG. 5 no encoder has been illustrated.

An exposure device 60 as just described, in particular with reference to FIG. 5, is often used in an imagesetting system. This will be explained immediately with reference to FIGS. 6 and 7, wherein FIG. 6 shows detailed mechanical parts of an internal drum type exposing device for use according to the present invention, and wherein FIG. 7 shows an electronical block diagram of an internal drum type exposing device for use according to the present invention.

Generally, according to well known imagesetting embodiments, images to be printed are assembled and edited electronically on a page layout workstation or "front end", and then transmitted to a raster image processor or "RIP" for digital color separation, half-tone screening and image rasterization. The "RIP image", that is the rasterized image to be printed e.g. by offset printing means, is then transmitted from the RIP to a laser imagesetter for photographic recording on e.g. film or paper.

Figure 6:
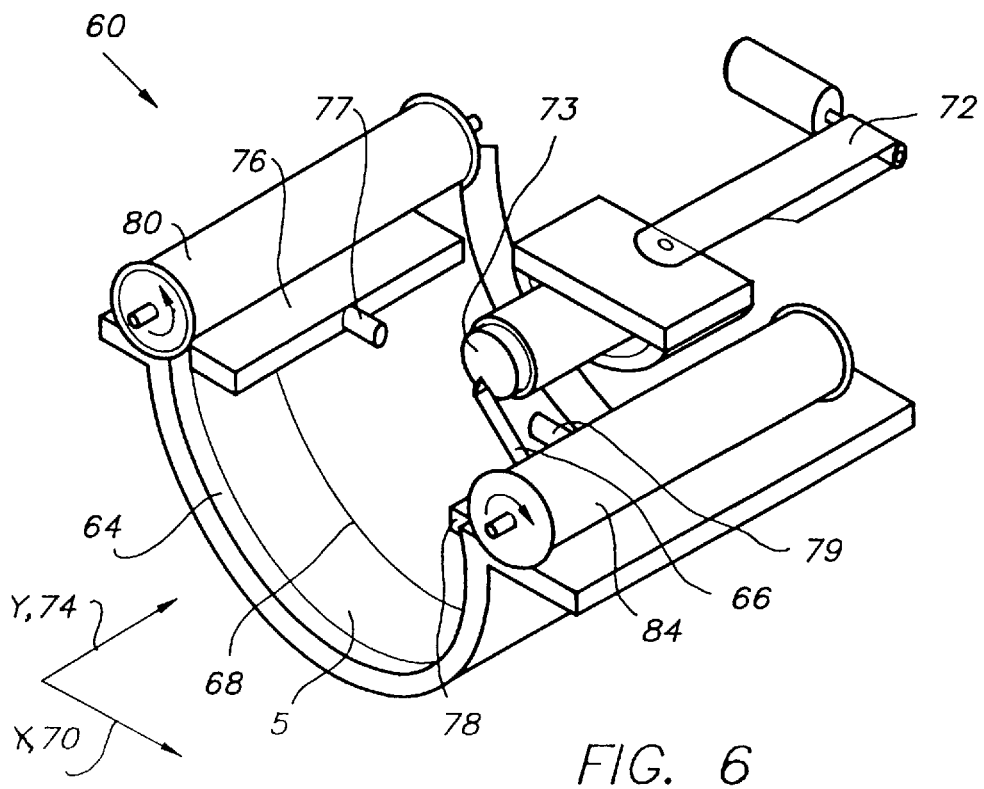
FIG. 6 shows more detailed mechanical parts of an internal drum type exposing device for use according to the present invention.
Figure 7:
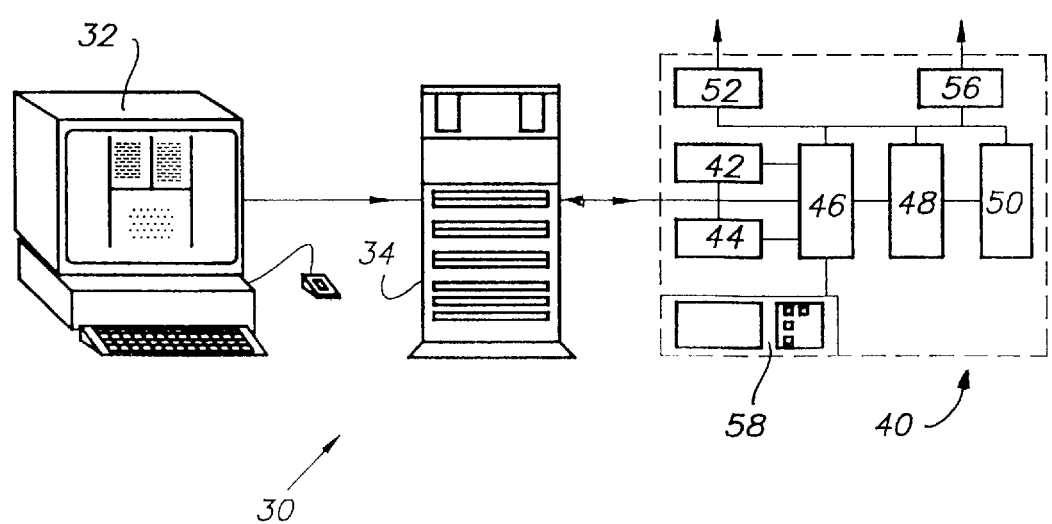
FIG. 7 shows an electronical block diagram of an internal drum type exposing device for use according to the present invention.

FIGS. 6 and 7 give a schematic representation of e.g. an electronic prepress system, indicated generally by the reference numeral 30, comprising a front end or page layout workstation 32, a RIP 34, an imagesetter controller 40, as well as key components of an internal drum laser imagesetter, generally indicated by reference numeral 60.

Imagesetter controller 40 includes serial communications interface module 42, which communicates with RIP 34 exchanging such information as size and resolution of the RIP image, as well as status information for imagesetter 60 and RIP 34. Imagesetter controller 40 also includes a parallel communications interface module 44 which is used to receive the RIP image data being transmitted from RIP 34. RIP image data received by parallel interface module 44 is loaded into image buffer 48 by main processor 46. The RIP image data is loaded as a series of scan lines 68, each scan line 68 comprising an equal number of image pixels, and each image pixel providing a beam on/beam off command.

Imagesetter 60 includes a web mounted imaging element, e.g. a DTR recording substrate 5, a drum 64, and a focused scanning laser beam 66. Focused scanning laser beam 66 is scanned at constant scan velocity by a scanning mechanism, generally referred to by numeral 73, thereby exposing scan line 68 which is parallel to main scan direction X, 70. Beam modulation is controlled by beam modulation controller 52, thereby modulating beam 66 in accordance with image pixel data stored in image buffer 48.

Imagesetter 60 also includes a cross-scan transport mechanism 72 which transports laser scanning mechanism 73, at constant cross-scan velocity, along a path parallel to cross-scan direction Y, 74. A new cross-scan velocity is selected for each new exposure resolution. Cross-scan velocity values are stored in main processor 46.

Imagesetter 60 generally also includes a header clamp mechanism 76, which clamps imaging element 5, and at least one header punch mechanism 77 which punches first registration aperture through web 5 (not shown in this figure). In addition, footer clamp mechanism 78 and at least one footer punch mechanism 79 provide the same clamp and punch functions, punching second registration aperture through web 5. Punch mechanisms 77 and 79 provide a center reference for imagesetter 60 in that the center of each aperture punching mechanism is coincident with the center of travel for cross-scan transport mechanism 72.

Imaging element 5 will always be center justified according to the center of punches 77 and 79 and according to the center of travel of cross-scan transport mechanism 72. This allows a recording web 5 of any width to be used.

Imaging element 5 passes from supply roll 80 between support drum 64 and header clamp mechanism 76, remains in contact with drum 64, passes between support drum 64 and footer clamp mechanism 78 and drives onto take-up roll 84. New unexposed recording material 5 always enters drum 64 from supply roll 80, advancing exposed recording material toward take-up roll 84. The entire length of recording material web 5 is maintained light-tight to eliminate unwanted exposure of the recording substrate.

Output state controller 50 coordinates synchronization of rotating laser scanner 73 with beam modulation controller 52 and cross-scan transport mechanism 72. Main processor 46 monitors the flow of data to and from image buffer 48. Once the entire RIP image has been exposed, main processor 46 sends an "end of job" message to the RIP 34 through serial communications module 42. Imagesetter 60 remains idle until RIP 34 initializes imagesetter controller 40 for a new take.

The imagesetter operator may input parameters through operator control panel 58. These parameters are independent of and, in some cases, supersede parameters set by front end 32 or RIP 34. Operator selectable parameters comprise e.g. how many registration apertures to punch, image position, inter-image spacing and exposure mode, e.g. positive or negative.

In each case of an operator selectable parameter, main processor 46 invokes a series of command steps which coordinates the various control systems in performing image exposure and transport steps of the imaging element 5. In addition to operator selectable parameters, main processor 46 also tracks pre-existing conditions, e.g. is an exposed image residing in drum 64, or is this the first RIP image since a power up or installation of a new imaging element 5.

The movement of imaging element 5 is controlled by web transport controller 56 which initiates a series of commands to clamp and unclamp clamps 76 and 78, to punch registration apertures with punch mechanisms 77 and 79 and to advance web 5 by some "feed length". Upon receiving a "beginning of take" command from RIP 34, main processor 46 initiates a web feed which advances web 5. In "start up" mode, the feed length is long enough to clear drum 64 of recording material and re-filling it with unexposed web material.

Some examples of RIP's comprise VIPER (tradename of Agfa's Macintosh-based software RIP), COBRA (tradename of Agfa's Sun-based software RIP), STAR 400/600 (tradename of Agfa's Emerald-based hardware RIPs).

A more complete description of such an imagesetter may be found in U.S. Pat. No. 5,345,870 (granted to Bailey et al, Miles Inc.) and is incorporated herein by reference.

It goes without saying that an imagesetting system as concisely depicted in FIG. 7, in practice, may be extended by several accessory-apparatuses (optionally included in a local network) as e.g. an Agfa HORIZON scanner or an Agfa ACS 100 scanner to the input side (for scanning and digitizing a hard copy original), or an Agfa TABSCRIPT 300 proofprinter to the output side, etc.

Attention is Given Now to the Wet Processing System Itself and to its Application Relative to Imagesetting Techniques.

As a rule, a processing apparatus for a photographic material or an imaging element comprises several treating units (see FIGS. 1, 2, 3) each of which optionally contains a different treatment liquid, such as a developing liquid, a fixing liquid and a rinsing liquid. The imaging element, to be processed is transported through these treating units by the use of one or more pairs of drive rollers, and thereafter to a drying unit. The time spent by the imaging element in each treating unit is determined by the transport speed and the dimensions of the treating unit in the sheet feed path direction.

Figure 8:
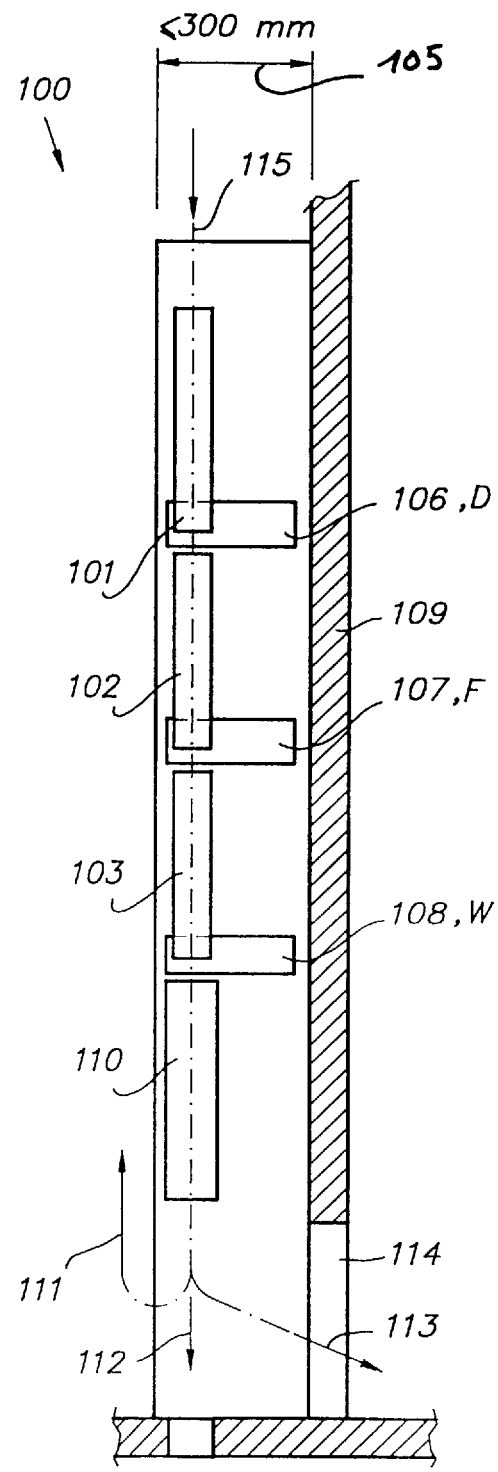
FIG. 8 shows a first embodiment of a vertical processor for use in the present invention.

FIG. 8 shows a processor 100 which comprises three superimposed treating units 101, 102 and 103 and a drying unit 110 below the lowermost treating unit 103. The vessel 106 of the uppermost unit 101 contains a supply of developer D, the vessel 107 of the unit 102 contains a supply of fixing liquid F, and the vessel 108 of the unit 103 contains a supply of rinsing or washing liquid W. The drying unit 110 and the treating units 101, 102, 103 are mounted at one side of an upright supporting member 109 and the thickness 105 of the entire processor, as considered in a direction from the left to the right, need not exceed 300 millimeters. Thus, the floor space requirements of the improved processor are negligible, especially when compared with the floor space requirements of conventional processor wherein imaging elements are caused to move along horizontal or nearly horizontal paths during travel through the developing, fixing and rinsing treating units (cfr. FIGS. 1, 2, 3).

The outlet at the lower end of the drying unit 110 can discharge the imaging elements in any desired direction. The arrows 111, 112, 113 indicate three different directions, namely, upwardly, downwardly and substantially horizontally through an opening 114 of the supporting member 109. The vertical path along which the imaging elements are caused to advance through the units 101, 102, 103 and the drying unit 110 is indicated by the phantom line 115.

An improved type of vertical processor is described in full detail and incorporated herein by U.S. patent application Ser. No. 08/643,824, entitled "Apparatus for the wet processing of photographic sheet material," filed May 7, 1996 and issued Jul. 29, 1997 as U.S. Pat. No. 5,652,939.

An improved type of rotatable rollers for use in a vertical processor is described in full detail and incorporated herein by U.S. patent application Ser. No. 08/643,795, entitled "Appartatus for the wet processing of photographic sheet material.", filed May 7, 1996 and allowed Mar. 28, 1997, now U.S. Pat. No. 5,689,750.

An advantageous solution for sealing problems within a vertical processor is described in full detail and incorporated herin by now abandoned application U.S. patent application Ser. No. 08/643,825, entitled "apparatus for the wet processing of photographic sheet material," filed May 7, 1996 and allowed Sep. 30, 1997.

Each treating unit 101, 102, 103 may be of modular construction and be provided with means to enable the treating unit to be mounted directly above or below a similar other treating unit.

By limiting the components in the treating unit to one pair of rollers, the volume thereof can be many times smaller than the volume of an equivalent treating unit in a horizontal processing apparatus. This has advantages in terms of the volume of treatment liquids used and the efficiency of their interaction with the imaging element, particularly the uniformity of reaction.

Evidently, one or more of the treating units of the apparatus may include additional features if desired. Thus, cleaning means may be provided for acting upon the rollers to remove debris therefrom, as described in EP-A-93.202.862.4 (in the name of Agfa-Gevaert). Additional roller pairs may be provided for transporting the imaging element through the apparatus. Guide means may be included for guiding the passage of the imaging element through the apparatus. Evidently, also heating means may be provided. Any combination of these additional features is also possible.

It may be clear that, because of the compact volume taken by the apparatus, any treating unit can be installed or removed (e.g. for maintenance purposes) by simple means, without the need for any crane or lifting-engine.

Attention is Given now to a Complete Imagesetting System with both Integrated Exposing Part and Integrated Processing Part.

Figure 9:
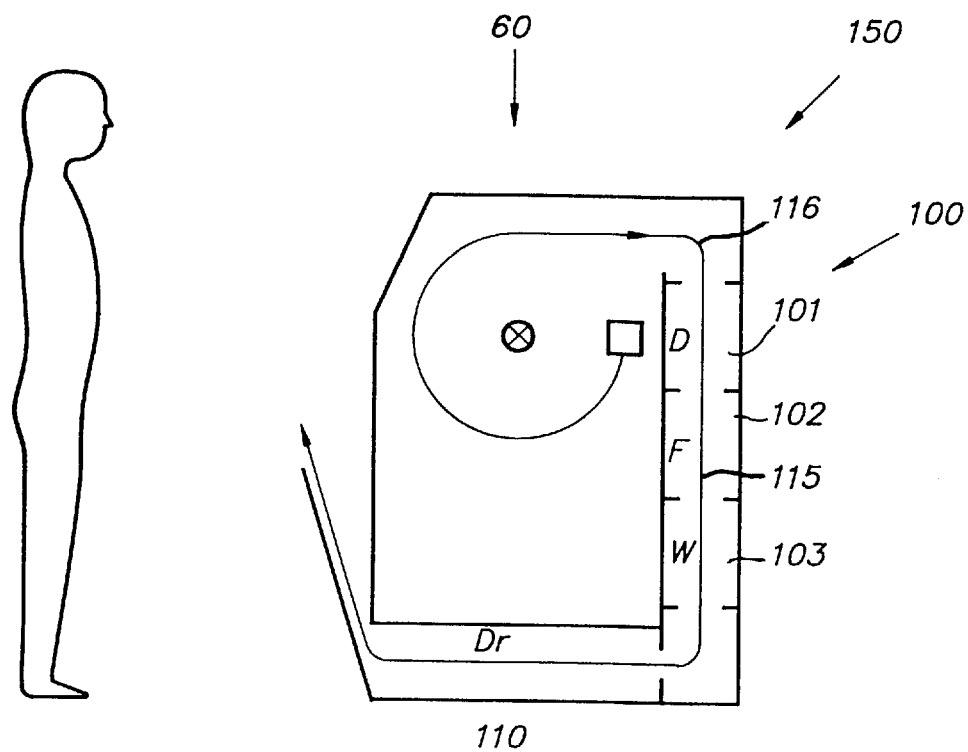
FIG. 9 shows a first embodiment of an imagesetter with an integrated vertical processor according to the present invention.

First, reference is made to FIG. 9, which is a cross section of a first embodiment of an imagesetter with an integrated vertical processor according to the present invention.

With reference to FIG. 9, the present application discloses an apparatus 150 for automatically exposing and processing an imaging element, comprising (i) an exposing part in which said imaging element is imagewise exposed, and (ii) a processing part in which said imaging element is wet processed, such that said exposed imaging element is fed automatically from said exposing part 60 into said processing part 100, said processing part comprising a plurality of cells mounted one above the other in a stack to define a substantially vertical sheet material path 115 through said processing part 100, each of said cells being connected to adjacent cells in said stack in a closed manner. Depending on the system and on the specific layout (as mentioned in U.S. patent application Ser. No. 08/643,824), some parts of the wet processing path can be horizontal.

More particularly, in a further preferred embodiment of the present invention, the exposing part 60 comprises an imagesetter and the processing part 100 comprises at least means for developing 101 said imaging element. In FIG. 9, the reference number 116 denotes a mechanical deflector which is used to guide imaging elements along an arcuate path towards and into the uppermost treating unit 101.

In a further preferred embodiment of the present invention, the processing part 100 further comprises means for fixing 102 and for washing or rinsing 103, and optionally also means for drying 110 the imaging element. Herein, the treating units 101, 102 and 103 may, but need not be identical.

Thus, in an apparatus according to the present invention, exposing part 60 and processing part 100 are fully integrated into one recording apparatus, even within one common housing.

For people skilled in the art, it may be evident that in a preferred embodiment of the present invention, the apparatus 150 further comprises driving means (not shown for sake of clarity) for catching the imaging element and guiding said imaging element first through the exposing part, and then through the processing part.

It is stated firmly that substantial savings in floor space can be achieved even if some of the treating units 101, 102 and 103 are disposed side-by-side rather than one above the other. This will be readily appreciated since the floor space requirements of the units 101, 102 or 103 are only a fraction of floor space requirements of a conventional treating unit wherein the imaging elements must travel along a horizontal path.

Figure 10:
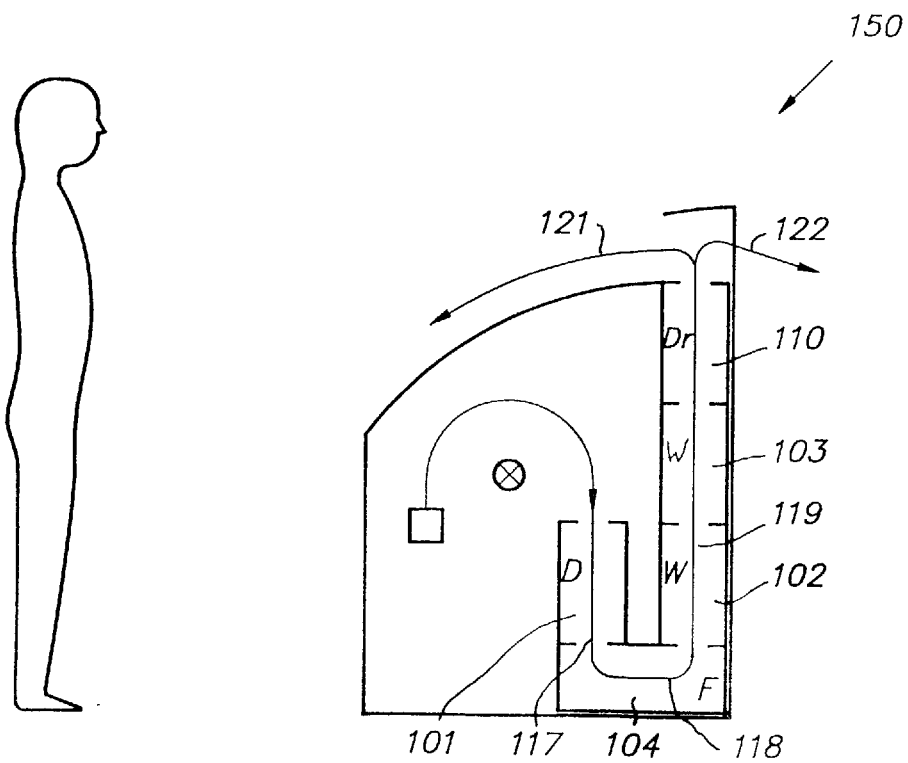
FIG. 10 shows a second embodiment of an imagesetter with an integrated vertical processor according to the present invention.

In order to illustrate this statement, reference is made to FIG. 10 which gives a cross section of a second embodiment of an imagesetter with an integrated vertical processor according to the present invention. Herein, FIG. 10 shows a different apparatus 150 wherein the imaging elements are transported along a composite path including a vertical portion 117, an arcuate portion 118 and a vertical portion 119. The treating unit 101 serves to contact the imaging elements with a liquid developer D. The unit 104 serves to move the imaging elements along path portion 118 which may but need not be a meandering path and optionally it also serves to contact the imaging elements with a fixing liquid F. The upright treating unit 102 and optionally also 103 serve to contact the imaging elements with a washing or rinsing liquid W. Thereabout, it is immaterial whether the first treating unit receives imaging elements from above or from below.

Apparatus of the type shown in FIG. 10 can be used when the height of the space which is available for the various treating units is less than necessary to allow for the mounting of all treating units one above the other.

A drying unit 110 above the treating unit can discharge treated imaging elements in any desired direction; two such directions are indicated by arrows 121 and 122.

It will also be noted that the outlet of the apparatus 150 is at the upper end of the drying unit 110 so that an operator who feeds imaging elements to the system also can monitor or collect the imaged elements issuing from the apparatus 150 (cfr. FIGS. 9 & 10). Thus, in a further preferred embodiment of the present invention, the apparatus 150 further comprises "outputting" means for laying down the exposed and processed imaging element in an exit tray at the operator's side of the apparatus.

In a particular preferred embodiment of the present invention, the apparatus further comprises "turning" means for laying down the exposed and processed imaging element in an exit tray at the operator's side of the apparatus either face up (cfr. 121), either face down (cfr. 122).

As stated already before, a vertical proccessor according to the present invention may be advantageously combined or integrated with an imagesetter, which could not be carried out with a vertical processor according to U.S. Pat. No. 4,166,689, because that one has no gastight characteristics, so that vapour from a processing liquid and/or drying heat could penetrate in the imagesetter with possibly disturbing influences on the quality and/or reliability of the system and possibly necessitating a costly airconditioning system. This is one of the reasons why the present invention makes it feasible to integrate the exposing part and the processing part in one same handling system for the imaging element, in one same housing.

A vertical proccessor according to the present invention also has fewer parts than a vertical processor according to U.S. Pat. No. 4,166,689 and takes even less volume.

Contamination and evaporation, oxidation and carbonization can both be reduced in a simple manner by a particular construction of the apparatus.

An apparatus for the processing of photographic sheet material comprises a plurality of cells mounted one above the other in a stack to define a substantially vertical sheet material path through the apparatus, each cell comprising a housing within which is mounted a rotatable roller biased towards a reaction surface to define a roller nip there between through which the sheet material path extends and associated sealing means serving to provide a gas-and liquid-tight seal between the roller and reaction surface on the one hand and a wall of the housing on the other. According to a first aspect, the apparatus is characterized by means for connecting each cell to adjacent cells in the stack in a closed manner. According to a second aspect, the apparatus is characterized in that the roller is a drive roller.

By providing a gas-and liquid-tight seal between the roller and reaction surface on the one hand and a wall of the housing on the other, treatment liquid in one vessel is not contaminated by the contents of adjacent vessels, while constituting the roller as a drive roller enables the cell to be constituted in a particularly simple manner, in contrast to the apparatus described in U.S. Pat. No. 4, 166,689, where the rollers with which sealing means are associated to provide a seal to the housing are freely rotatable squeegee rollers, necessitating the provision of further roller pairs to advance the sheet material through the apparatus.

In preferred embodiments, there are provided means for connecting each cell to adjacent cells in the stack in a closed manner. By the term "closed manner" in this specification is meant that each cell is so connected to adjacent cells that no cell is open to the environment. By connecting cells together in this manner, contrary to the apparatus described in U.S. Pat. No. 4,166,689, the evaporation, oxidation and carbonization of treatment liquids can be significantly reduced.

The reaction surface towards which the roller is biased to define the nip will usually be the surface of another roller, or for the reaction surface to be in the form of a belt or a fixed surface with a low friction coefficient. Where this general description refers to the use of two rollers, it is to be understood that the second roller may be replaced by any other reaction surface, such as those referred to above.

The housing wall of each cell may comprise an upper housing wall part and a lower housing wall part, the upper housing wall part being so shaped in relation to the lower housing wall part of the next higher cell as to provide a substantially closed connection between adjacent cells. For example, the upper and lower housing wall parts may be provided with flanges, means being provided to secure the flange of the upper housing wall part with the flange of the lower housing wall part of the next higher cell thereby to provide the substantially closed connection.

The rollers and associated sealing means of the top-most cell of the stack serve to provide a gas-tight cover for the apparatus.

At least one cell of the stack is preferably in the form of a vessel, suitable for containing treatment liquid, the rollers and sealing means serving to retain treatment liquid in the vessel. The top-most cell will not normally be a liquid-containing vessel, serving simply as the gaslight cover for the apparatus.

A lower part of the housing wall of each vessel may be so shaped as to define a leakage tray so positioned that any treatment liquid which passes, for example, through the nip drips into the leakage tray, for collection and re-circulation as desired Each cell may be of modular construction and provided with means to enable the cell to be mounted directly above or below an identical or similar other cell. Alternatively, the apparatus may take an integral or semi-integral form in which the means for connecting each cell to adjacent cells in the stack in a closed manner is constituted by a common housing wall of the apparatus. By the term "semi-integral form" we intend to include an apparatus which is divided by a substantially vertical plane passing through all the vessels in the apparatus, particularly the plane of the sheet material path, enabling the apparatus to be opened-up for servicing purposes, in particular to enable easy access to the rollers.

By the use of a vertical configuration, the cross-section of the cell can be low, such as less than 3 times the roller diameter. The volume of the cell can therefore be low. Indeed, for a given sheet material path length, the volume of one vessel of a vertical processing apparatus can be many times smaller than the volume of an equivalent treatment bath in a horizontal processing apparatus. This has advantages in terms of the volume of treatment liquids used and the efficiency of their interaction with the sheet material.

A basic cell of the apparatus merely the rollers and associated sealing means. Nevertheless, one or more of the cells of the apparatus may include additional features if desired. Cleaning means may be provided for acting upon the rollers to remove debris therefrom, as described in European patent application EP 93202862 (Agfa-Gevaert NV), filed 11 Oct. 1993. Additional rollers, such as a roller pair or staggered rollers may be provided for transporting the sheet material through the apparatus, and these rollers will normally be driven rollers. Additional roller pairs may be provided for breaking the laminar fluid at the surface of the sheet material as it passes through the apparatus, and these rollers may be driven rollers or freely rotating rollers. Even when additional roller pairs are present, the rollers to which the ($\phi$/L) criteria applies and their associated sealing means will usually constitute the lower roller pair, serving to close the lower opening of the vessel. Spray means may be provided for applying treatment liquid to the sheet material. Guide means may be included for guiding the passage of the sheet material through the apparatus. Heating means may be provided in one or more cells so that the cell becomes a sheet material drying unit, rather than a wet treatment unit. While liquid pumping, heating, cooling and filtering facilities will normally be provided outside the cells, it is possible for some elements of these features to be included in the cells themselves. Any combination of these additional features is also possible.

In one embodiment, one or more of the vessels includes at least one passage through the housing wall thereof to constitute a treatment liquid inlet to and/or outlet from the vessel.

One or more cells may not contain processing liquid, these cells providing, for example, a dead space where diffusion reactions can occur on the sheet material as it passes therethrough.

A convenient arrangement for the processing of photographic sheet material may comprise a first vertical processing apparatus coupled to a horizontal processing apparatus in which the sheet material passes along a substantially horizontal path. The horizontal apparatus may in turn be coupled to a second vertical processing apparatus. For example, the first vertical processing apparatus is adapted for the development of images on the photographic sheet material and will therefore include one or more vessels containing developer solution, the horizontal processing apparatus is adapted for the fixing of developed images on the photographic sheet material and will therefore include one or more vessels containing fixing solution, and the second vertical processing apparatus is adapted for the cascade washing and optionally drying of the photographic sheet material.

It is desirable that the gas-and liquid-tight seal between the rollers and the housing wall is achieved in a simple and reliable manner. We therefore prefer a construction in which the rollers are axially offset relative to each other and each roller is in sealing contact along its length, at least between the limits of the nip, with a stationary sealing member.

The sealing member preferably includes a portion which extends longitudinally along the surface of the associated roller. This longitudinal part of the sealing member may extend in a straight line parallel to the associated roller axis and preferably contacts the surface of the associated roller at a location which is between 45° and 225°, most preferably between 80° and 100° from the center of the nip, on the fluid side. The benefit of this arrangement is that the sealing members do not influence the bias forces between the rollers, or only influence these forces to a limited extent.

In a preferred construction of the apparatus, the sealing member is carried on a sealing support, secured to the housing wall of the cell.

By arranging for the rollers to be axially offset with respect to each other, it is possible that the sealing member may include a portion which extends circumferentially around the surface of its associated roller. To ensure a good seal at this point, the sealing support may be in contact with the end face of the opposite roller. Means, such as sinus springs incorporated in the roller mountings, may be provided for pulling each of the rollers against a respective end plate of the sealing support with a force of from 2 to 500 g/cm of contact between the end plate and the end face of the roller measured at the surface of the roller. In order to reduce the torque required to rotate the rollers, the ratio of the maximum roller diameter to the length of the nip is preferably greater than 0.012.

The sealing member may be in a unitary or composite form which exerts a spring force of between 2 and 500 g/cm of roller, perpendicular to the roller surface. The spring loading may be derived from the geometry of a unitary sealing member, from a separate spring incorporated in a composite sealing member or simply from the compression of the elastomeric material covering the roller. The sealing member material which is in contact with the associated roller surface preferably has a coefficient of friction (as measured against stainless steel) of from 0.05 to 0.3, preferably from 0.09 to 0.2. The sealing member material in contact with the associated roller surface may comprise a polymer material such as PTFE (poly tetra fluoro ethylene), POM (polyoxymethylene), HDPE (high density polyethylene), UHMPE (ultra high molecular weight polyethylene), polyurethane, PA (polyamide), PBT (polybutyl terephthalate) and mixtures and composites thereof. We prefer to use a PTFE profile backed with a stainless steel spring.

In a preferred embodiment, the rollers are substantially equal in length. One or both rollers may constitute drive rollers for driving the sheet material along the sheet material path. Alternatively, the second roller may be freely rotating.

Typical rollers have a core provided with a covering of elastomeric material, although it is possible for the roller to be elastomeric throughout its cross-section. As the sheet material leaves a given liquid treatment vessel it is necessary to remove any liquid carried on the sheet material as efficiently as possible, to prevent carry-over of liquid into a next treatment cell and to reduce edge effects which arise from non-homogeneous chemistry on the sheet material after squeegeeing. To do this job properly, the rollers must exert a sufficient and homogeneous pressure over the whole width of the sheet material. Also, to reduce edge effects, it is desirable that the opposite roller surfaces are in contact with each other beyond the edges of the sheet material. To put this problem in context, rollers used in conventional processing apparatus for example have a length of 400 mm and a diameter of from 24 to 30 mm. The sheet material typically has a width of from a few millimeters up to 2 m and a thickness of 0.05 mm to 0.5 mm. In view of the nature of elastomeric material, it is in fact impossible to totally eliminate any gap between the roller surfaces at the edges of the sheet material as it passes through the nip. It is desirable that the roller surfaces be in contact with each other within as short a distance as possible from the edges of the sheet material i.e. that the size of the leak zone should be minimized. It is important however that the force between the rollers is sufficient to prevent leakage when no sheet material is passing through. However, the force must not be so high as to risk physical damage to the sheet material as it passes through the nip.

The objective of a minimum leak zone referred to above can be achieved if the ratio of the diameter of the roller to its length is above a critical limit.

According to a preferred embodiment therefore, at least one of the rollers, and preferably each roller, comprises a rigid core carrying a covering of elastomeric material, the ratio ($\phi$/L) of the maximum diameter ($\phi$) of the elastomeric material covering to the length (L) thereof being at least 0.012, most preferably between 0.03 and 0.06. Where the reaction surface towards which the roller is biased to define the nip is the surface of another roller, it is preferred that the roller requirements referred to above apply to this, second, roller also. Indeed, it will be usual for the two rollers to be identical, although it is possible that the diameters ($\phi$), and therefore the ratios ($\phi$/L), of the two rollers need not be identical. It is also possible that the reaction surface may be formed by the surface of a second roller which does not conform to the above requirements, such as for example, a roller having no elastomeric covering, or for the reaction surface to be in the form of a belt The elastomeric material covering preferably has a thickness of between 1 mm and 30 mm. The elastomeric material may be selected from ethylene/propylene/ dieneterpolymers (EPDM), silicone rubber, polyurethane, thermoplastic rubber such as Santoprene (Trade Mark for polypropylene/ EPDM rubber), styrene-butyl rubber and nitrile-butyl rubber. The hardness of the elastomeric material may be between 15 Shore (A) and 90 Shore (A), as measured on the roller surface. In one embodiment, the diameter ($\phi$) of the elastomeric material covering is constant along the length of the roller. Alternatively the roller may have a radial dimension profile which varies along the length thereof In the latter case, the diameter ($\phi$) in the expression $\phi$/L is the maximum diameter. In a preferred embodiment, such a roller comprises a non-deformable core, the thickness of the elastomeric material covering varying along the length thereof. Alternatively or additionally, the diameter of the core varies along the length thereof.

Ideally, the radial diversion profile of such a roller is such in relation to the force applied by the roller to sheet material passing through the nip as to be substantially even over the width thereof.

The radial dimension of the roller ideally decreases towards the ends thereof i.e. a convex profile, especially a parabolic profile.

Preferably, the core has a flexural E-modulus of between 50 Gpa and 300 Gpa. Suitable materials for the rigid core include metals, such as stainless steel, non-ferrous alloys, titanium, aluminum or a composite thereof In one embodiment, the core is hollow. Alternatively the core may be solid.

The rollers may be biased together by a variety of methods. The rollers may be biased together for example by making use of the intrinsic elasticity of the elastomeric material, by the use of fixed roller bearings. Alternatively, use may be made of resilient means such as springs which act on the ends of the roller shafts. The springs may be replaced by alternative equivalent compression means, such as a pneumatic or a hydraulic cylinder.

The apparatus for the wet processing of photographic sheet material such as X-ray film as shown in the FIGS. 11 to 16 comprises a plurality of treatment cells 212, 212', 212" mounted one above another. These cells may be arranged to provide a sequence of steps in the processing of sheet photographic material, such as developing, fixing, rinsing and drying. The cells may be of a modular structure as shown or may be part of an integral apparatus.

Figure 11:
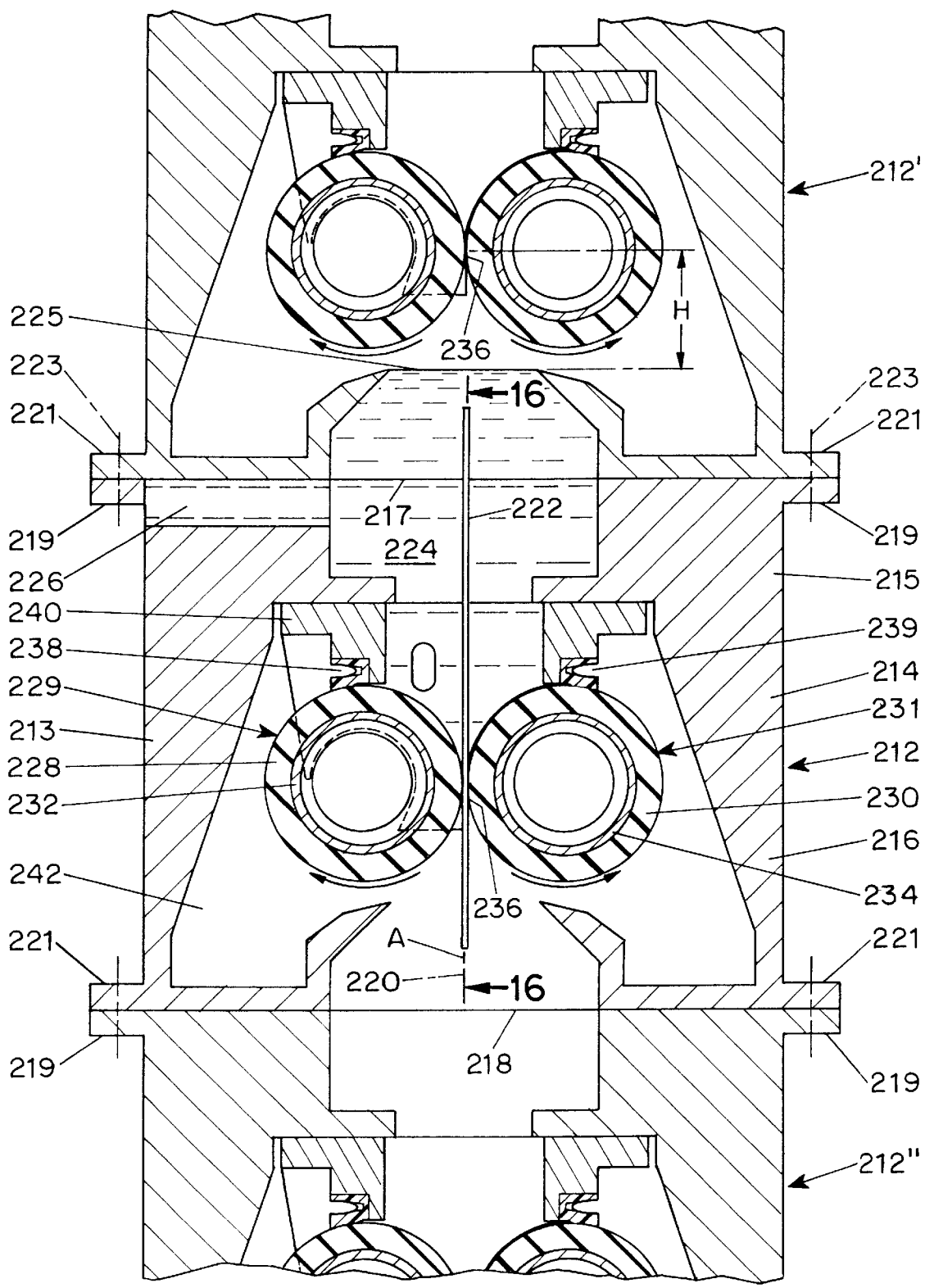
FIG. 11 is a cross-sectional view of one cell of a vertical processing apparatus according to the invention, with adjacent cells being partly shown.

FIG. 11 shows that the cell 212 is in the form of a vessel 213 which is of generally rectangular cross-section comprising a housing defined by a housing wall 214 so shaped as to provide an upper part 215 having an upper opening 217 and a lower part 216 having a lower opening 218. The upper opening 217 constitutes a sheet material inlet and the lower opening 218 constitutes a sheet material outlet. The inlet and outlet define there-between a substantially vertical sheet material path 220 through the vessel 213, the sheet material 222 moving in a downwards direction as indicated by the arrow A. Mounted within the cell 212 are a pair of rotatable drive rollers 228, 230. The vessel 213 contains treatment liquid 224, a passage 226 through the housing wall 214 being provided as an inlet for the treatment liquid 224. The distance H between the surface 225 of the liquid 224 and the nip of the rollers of the next upper cell 212' is as low as possible.

Each roller 228, 230 is of the squeegee type comprising a stainless steel hollow core 232 carrying an elastomeric covering 234. The core 232 is in cylindrical form having constant internal and external diameters along the length thereof. The rollers 228, 230 are biased towards each other with a force sufficient to effect a liquid tight seal but without causing damage to the photographic sheet material 222 as it passes there-between. The line of contact between the roller surfaces 229 and 231 defines a nip 236. The sheet material preferably has a width which is at least 10 mm smaller than the length of the nip, so as to enable a spacing of at least 5 mm between the edges of the sheet and the adjacent limit of the nip 236, thereby to minimize leakage. The rollers 228, 230 are coupled to drive means (not shown) so as to constitute drive rollers for driving the sheet material 222 along the sheet material path 220.

Each roller 228, 230 is in sealing contact along its length, with a respective stationary sealing member 238, 239 carried on a sealing support 240, which in turn is secured to the housing wall 214 of the vessel 213, the sealing members 238, 239 serving to provide a gas-and liquid-tight seal between the rollers 228, 230 on the one hand and the housing wall 214 on the other. The treatment liquid 224 is therefore retained in the vessel 213 by the rollers 228, 230 and the sealing members 238, 239. The sealing members 238, 239 are formed of PTFE and have a composite structure as shown more clearly in FIG. 12, referred to below. The sealing members 238, 239 are secured to the sealing support 240 by a suitable, water- and chemical-resistant adhesive, such as a silicone adhesive.

The upper and lower housing wall parts 215, 216 are provided with flanges 219, 221 respectively provided with bolts indicated by broken lines 223 to enable the cell 212 to be mounted directly above or below an identical or similar other cell 212', 212", as partly indicated FIG. 11. In the illustrated embodiment, the adjacent cells 212' and 212" are non-liquid containing cells. The upper housing wall part 215 is so shaped in relation to the lower housing wall part 216 as to provide a substantially closed connection between adjacent cells. Thus, treatment liquid from vessel 213 is prevented from falling into the lower cell 212" by the rollers 228, 230 and sealing members 238, 239, while vapors from the lower cell 212" are prevented from entering the vessel 213 or escaping into the environment. This construction has the advantage that the treatment liquid in the vessel 213 is not contaminated by contents of the adjacent cells and that by virtue of the treatment liquids being in a closed system evaporation, oxidation and carbonization thereof (and any other undesirable exchange between the treatment liquid and the environment) is significantly reduced.

The lower part 216 of the housing wall 214 is so shaped as to define a leakage tray 242. Any treatment liquid which may pass through the roller nip 236, in particular as the sheet material 222 passes there-through, drips from the rollers and falls into the leakage tray 242 from where it may be recovered and re-circulated as desired.

Figure 12:
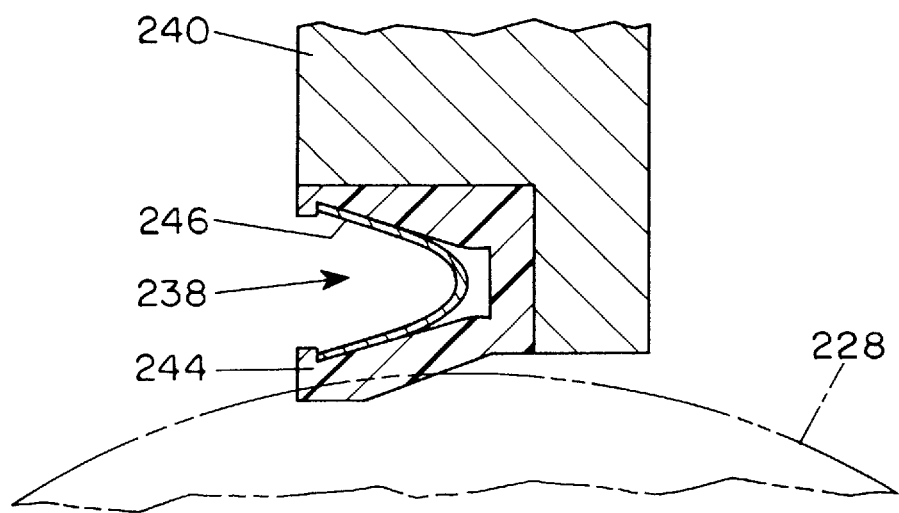
FIG. 12 is a cross-sectional view of a sealing member forming part of the cell shown in FIG. 11, together with part of adjacent components.

As can be seen more clearly in FIG. 12, the sealing member 238 is of composite structure having an open profile 244 formed of PTFE, within which profile is incorporated a stainless steel spring 246. FIG. 12 also shows how the sealing member 238 is retained in the sealing support 240. In FIG. 12, the sealing member 238 is shown in its relaxed position, the outline of the roller 228 also being shown in this Figure. The two sealing members 238, 239 are identical in the illustrated embodiment.

Figure 13:
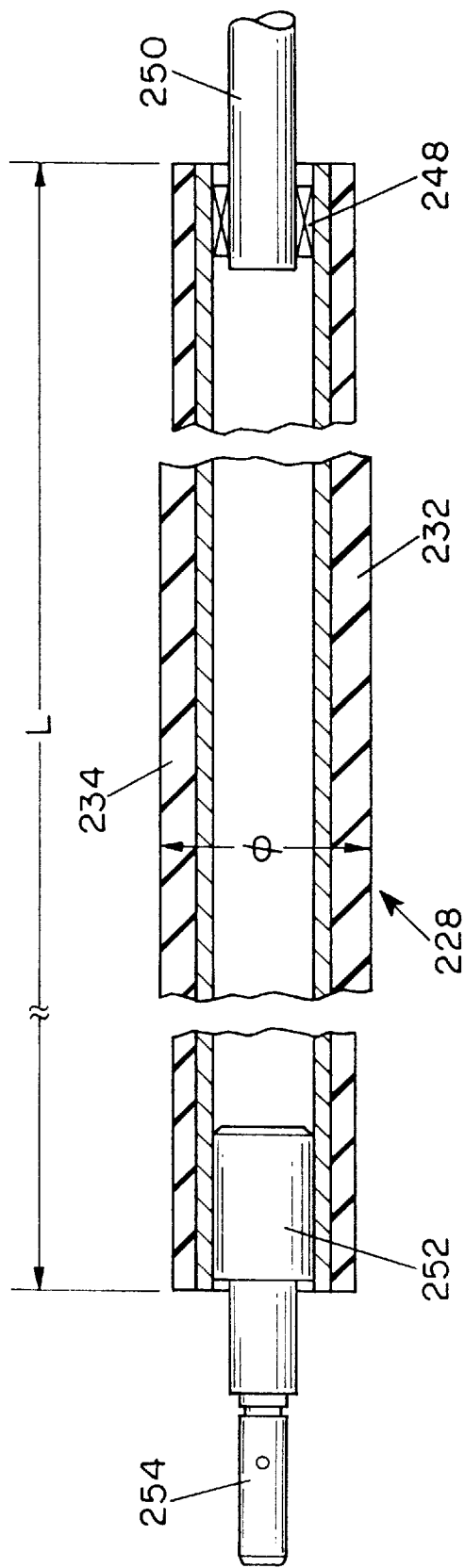
FIG. 13 is a longitudinal cross-sectional view showing the detail of the construction of one roller used in the cell shown in FIG. 11.

The construction of roller 228 is shown in more detail in FIG. 13. The construction of roller 230 is similar. The roller 228 comprises a core 232 of stainless steel, having a constant outside diameter of 25 mm and an internal diameter of 19 mm. The stainless steel core 232 has a flexural E-modulus of 210 Gpa. The core 232 is provided with a covering 234 of EPDM rubber, an elastomer having a hardness of 30 Shore (A). The core 232 has a thickness varying from 7 mm and the roller ends to 7.5 mm at the roller center. The roller 228 has a length of 750 mm and a maximum diameter of 40 mm. The maximum $\phi/L$ ratio is therefore approximately 0.053.

FIG. 13 also shows two possible methods of mounting the roller, one at each end thereof. In practice, it will be usual to use one method only at both ends. At the right hand end of FIG. 13, an internal bearing 248 is provided in which a fixed shaft 250 locates, the shaft being fixedly carried in the apparatus. At the left-hand end of FIG. 13, a spindle 252 is fixedly retained in the hollow core 232 and has a spindle end 254 which extends into a bearing (not shown) in the apparatus, or carries a drive wheel thereon. This construction is suitable for that end of the roller which transmits the drive.

Figure 15:
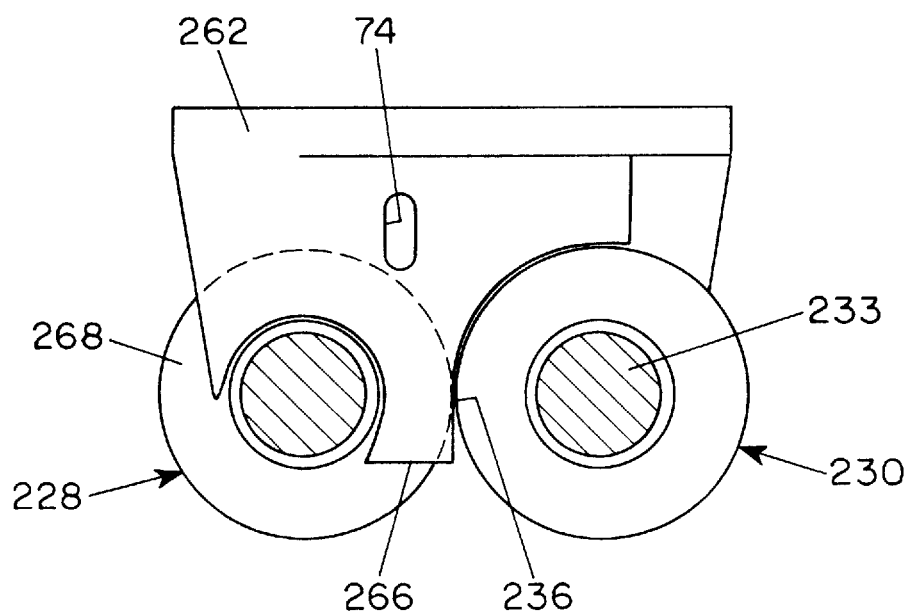
FIG. 15 is an end view of the sealing support and rollers taken in the direction 15—15 in FIG. 14.
Figure 14:
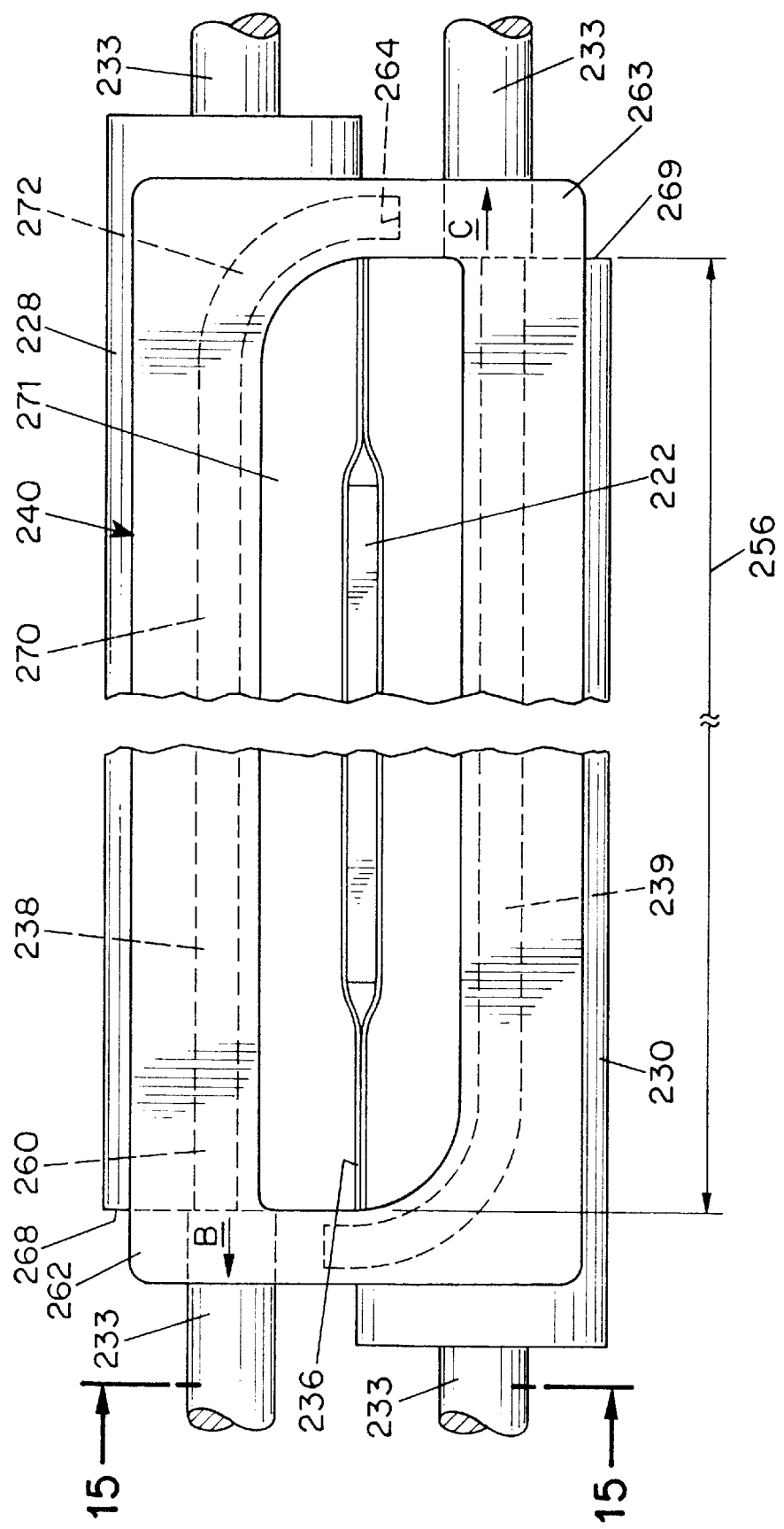
FIG. 14 is a view from above showing the sealing support and rollers of the cell shown in FIG. 11.

As indicated in FIGS. 14, 15 and 16, the rollers 228, 230 are axially offset relative to each other. The nip 236 has a length which extends between limits 256 beyond the limits 258 of the lower opening 218. The rollers 228, 230 are substantially equal in length.

The end plate 262 of the sealing support 240 is so shaped as to have a lower edge 266 which follows a circumferential line around the shaft 233 of the first roller 228 and a circumferential line around the second roller 230 to enable the end plate to be in face-to-face contact with the end face 268 of the first roller 228. At its lowest point, the edge 266 is below the level of the nip 236. The circumferential distance over which the end plate 262 is in contact with the end face 268 of the first roller 228 is larger than the circumferential distance between the nip 236 and the sealing member 238.

One end 260 of the sealing member 238 is pulled against an end plate 262. To achieve this, the roller 228 is pulled in the direction of the arrow B by sinus springs, not shown, incorporated in the roller mountings. A suitable pulling force is from 2 to 500 g/cm of contact between the end plate 262 of the sealing support 240 and the end face 268 of the roller 228 measured at the surface of the roller. The sealing member 238 includes a portion 270 which extends longitudinally in a straight line away from the end plate 262 along the surface 229 of the first roller 228. The sealing member 238 contacts the surface 229 of the first roller 228 at a location which is about 90° from the center of the nip 236 on the fluid side, that is from the plane joining the axes of rotation of the rollers 228, 230. By arranging for the rollers 228, 230 to be axially offset with respect to each other, it is made possible for the sealing member 238 to include a portion 272, which extends circumferentially around the surface of the first roller 228. This circumferentially extending portion 272 of the sealing member 238 completes a sealing path to the opposite end plate 263, where the end of the sealing member 238 is retained in a blind aperture 264 formed in the end plate 263, while the end plate 263 bears against the end face 269 of the second roller 230. The second sealing member 239 is similarly constructed and retained in the sealing support 240, the roller 230 being pulled in the direction of the arrow C. The two sealing members 238, 239 and the two end plates 262, 263 of the sealing support 240 thereby complete a continuous sealing path which, together with the roller nip 236 retains the treatment liquid 224 in the vessel 213.

The end plates 262, 263 each include an aperture 274, the lower edge of which is positioned below the level of the top of the rollers 228, 230, enabling the bulk of the treatment liquid 224 to flow out of the vessel at each end thereof and to be re-circulated as desired.

Figure 17:
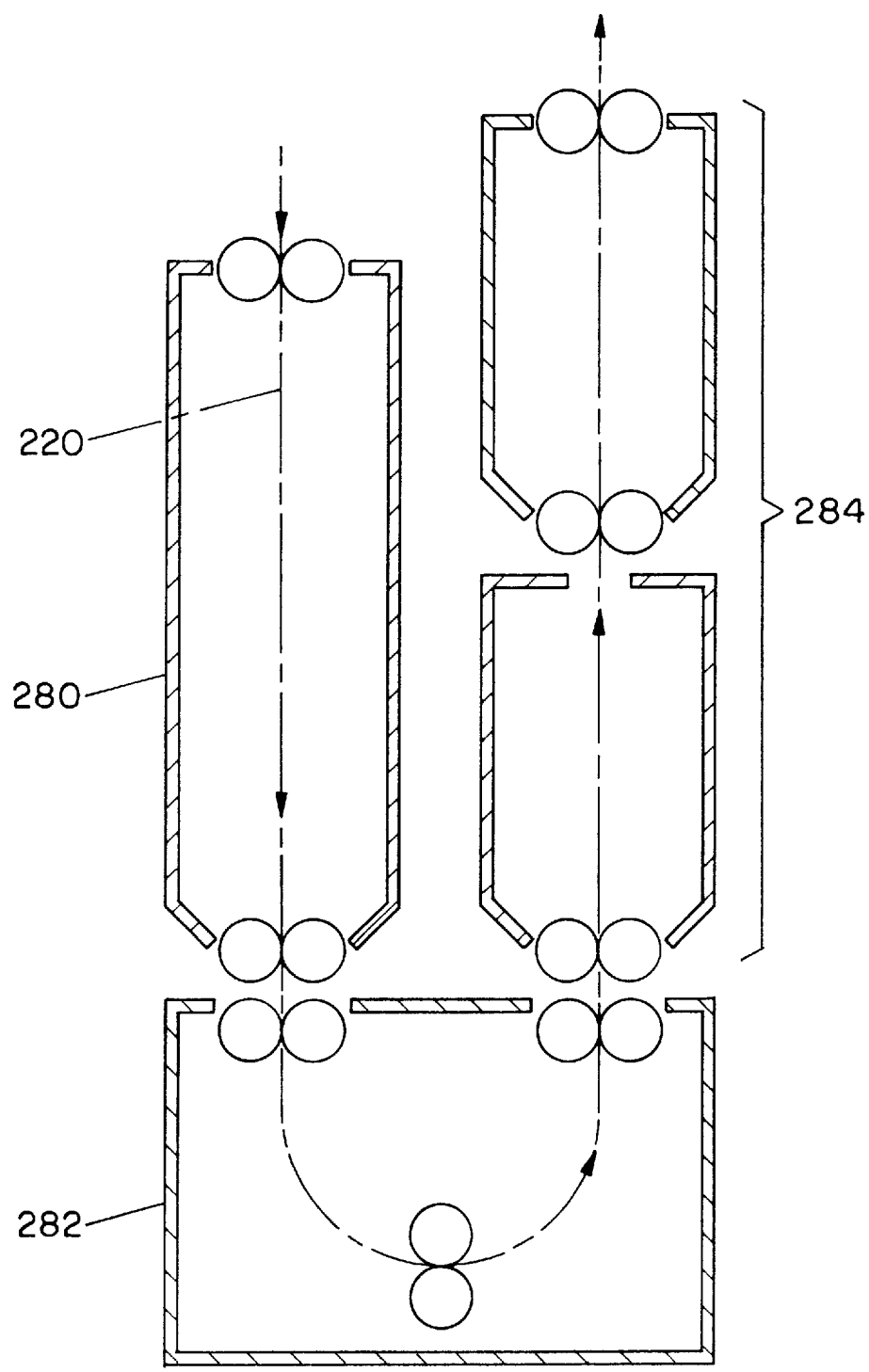
FIG. 17 shows schematically an arrangement for the processing of photographic sheet material, incorporating the vertical processing apparatus as shown in FIGS. 11 to 16.

The arrangement for the processing of photographic sheet material shown in FIG. 17 comprises a first vertical processing apparatus 280 constructed for example as shown in FIGS. 1 to 16, adapted for the development of images on the photographic sheet material. The first vertical processing apparatus 280 is coupled to a horizontal processing apparatus 282 adapted for the fixing of developed images on the photographic sheet material, in which the sheet material passes along a substantially horizontal path. The horizontal processing apparatus 282 is in turn coupled to a second vertical processing apparatus 284 also constructed for example as shown in FIGS. 11 to 16, but with the sheet material passing upwardly, the second vertical processing apparatus 284 being adapted for the cascade washing of the photographic sheet material.

Full description of two advantageous embodiments of drying units 110 may be found in e.g. EP-A-94.203.533.9 (in the name of Agfa-Gevaert) and in U.S. patent application Ser. No. 08/384,768 (assigned to Agfa-Gevaert).

Imagewise exposure in accordance with the present invention may proceed by a scanwise exposure by means of e.g. Cathode Ray Tubes (CRT's), Light Emitting Diodes (LED-'s) or lasers. Examples of lasers that can be used in connection with the present invention are e.g. HeNe lasers, Argon ion lasers, semiconductor lasers, YAG lasers e.g. Nd-YAG lasers etc.

Preferred Embodiments for Making a Lithographic Printing Plate

It will be understood that the description and specific examples, while indicating preferred embodiments, are given by way of non-restrictive illustration only.

Imagewise exposure in accordance with the present invention may proceed by a scanwise exposure by means of e.g. a laser directly according to said screened data on a printing plate precursor (socalled computer to plate) or it may be performed by first exposing according to said screened data an intermediate photographic film of high contrast, generally a high contrast silver halide film, and then using the imaged photographic film as a mask for exposing a lithographic printing plate precursor to a conventional light source in a camera exposure or contact exposure. An example of such an intermediate photographic film (as imaging element) is marketed by Agfa-Gevaert under the name AGFASTAR.

Examples of photosensitive lithographic imaging elements are, for example, the silver salt diffusion transfer (generally referred to as DTR) materials disclosed in EP-A-410500, EP-A-483415, EP-A-423399, imaging elements having a photosensitive layer containing diazonium salts or a diazo resin as described for example in EP-A-450199, and imaging elements having a photosensitive layer containing a photopolymerizable composition as described for example in EP-A-502562, EP-A-491457, EP-A-503602, EP-A-471483 and DE-A-4102173.

One process for obtaining a lithographic printing plate by means of a DTR process uses an imaging element comprising, in the order given, a support with a hydrophilic surface such as a grained and anodized aluminium foil, a layer of physical development nuclei and a silver halide emulsion layer. An example of such an imaging element is marketed by Agfa-Gevaert under the name LITHOSTAR. The imaging element of the present embodiment is imaged using a scanning exposure followed by a development step in the presence of development agent(s) and silver halide solvent(s) so that a silver image is formed in the physical development nuclei layer. Subsequently the silver halide emulsion layer and any other optional hydrophilic layers are removed by rinsing the imaged element with water so that the silver image is exposed. Finally the hydrophobic character of the silver image is preferably improved using a finishing liquid comprising hydrophobizing agents. More technical details about said development may be found in e.g. EP-A-93.201.305.5 and U.S. patent application Ser. No. 08/303,670 (both in the name of Agfa-Gevaert).

The present inventors have tested an image recording apparatus according to the present invention. In a first experiment, using an apparatus as shown in FIG. 9, a commercially available silver salt diffusion transfer lithographic printing plate LITHOSTAR LAP-B was imagewise exposed with screened cyan, magenta, yellow and black separations of a color image. Thereafter, the imaging element was subsequently developed using the processing liquid G5000B and the finishing liquid G5300B, each available from Agfa-Gevaert.

A second type of mono-sheet DTR material comprises on a support in the order given a silver halide emulsion layer and an image receiving layer containing physical development nuclei e.g. a heavy metal sulphide such as PdS. The image receiving layer is preferably free of binder or contains a hydrophilic binder in an amount of not more than 30% by weight. Subsequent to imagewise exposure, the mono-sheet DTR material is developed using an alkaline processing liquid in the presence of developing agents e.g. of the hydroquinone type and/or pyrazolidone type and a silver halide solvent such as e.g. a thiocyanate. Subsequently, the plate surface is stabilised or neutralised with a stabilising liquid. Details about the constitution of this type of mono-sheet DTR material and suitable processing liquids can be found in e.g. EP-A-423399, U.S. Pat. No. 4,501,811, and U.S. Pat. No. 4,784,933. Lithographic printing plate precursors of this type are marketed by Agfa-Gevaert under the names SETPRINT and SUPERMASTER.

The inventors also have conducted a further study on these materials. In a next experiment, commercially available imaging elements SUPERMASTER comprising on a support in the order given an anti-halation layer, a silver halide emulsion layer and a physical development nuclei layer were imagewise exposed. Thus obtained imagewise exposed imaging elements were then processed in a processor according to FIG. 10 wherein the developing unit contained as an alkaline processing liquid G260, the stabilising or neutralising unit contained as a stabilising liquid G360 (all commercially available from Agfa-Gevaert) and the rinsing unit contained plain water as a rinsing liquid.

It may also be clear that said scanwise exposing can be carried out by a light source with a visible spectrum or with an infrared spectrum or with an ultraviolet spectrum, depending on the actual imaging elements. Imaging elements suitable for DTR processing typically have a maximum sensitivity within the range of 400 to 800 nm, depending upon the nature of the imaging element. Thus, LITHOSTAR LAP-B has a maximum sensitivity at about 490 nm, LITHOSTAR LAP-O has a maximum sensitivity at about 550 nm, and SUPERMASTER imaging elements also have a maximum sensitivity at about 550 nm. Hence, the writing light beam 60 preferably has a wavelength within the range of 400 to 800 nm, such as from 450 to 600 nm.

Sensitivity spectra for imaging elements which can be used in the method according to the present invention may be found in the already mentioned EP-A-94.203.326.7.

In the following paragraphs, additional numerical information will be given relating to further preferred embodiments for making a lithographic printing plate.

In one of the preferred embodiments, in an apparatus according to the present invention, said processing part has a thickness (105) lesser than 500 millimeters, preferably lesser than 300 mm.

In a further preferred embodiments, in an apparatus according to the present invention, said processing part occupies a ground surface or floorspace less than 1.5 m$^2$, preferably even less than 1 mm$^2$.

In a still further preferred embodiments, an apparatus (including imagesetter and processor) according to the present invention, occupies a ground surface less than 2.5 m$^2$, preferably even less than 2 m$^2$.

In a still further preferred embodiments, in an apparatus according to the present invention, an efficiency ratio defined by the quotient of a system-throughput (comprising both exposing and processing), defined at a resolution of 1200 dpi, of imaging elements (expressed in square meter pro hour m$^2$/h) to a ground area (expressed in square meter m$^2$) occupied by the apparatus (also comprising all chemical vessels, containing as well fresh chemistry as used or waste chemistry) is higher than 6 h$^{-1}$, preferably higher than 10 h$^{-1}$. For example, a (maximal) throughput of 20 m$^2$/h (at 1200 dpi) is realised over a floorspace of nearly 2 m$^2$.

Also included within the scope of the protection of the present patent is a method for recording an image, e.g., for producing a lithographic printing plate, said method comprising the steps of (i) exposing an imaging element in an imagesetter, and (ii) processing said imaged element in a processor, such that said imaging element is guided automatically first through said imagesetter, and then through said processor, said processing step further comprising the step of guiding said imaging element, without leaving the apparatus and without any manual interference necessary from any operator, through a plurality of cells mounted one above the other in a stack to define a substantially vertical sheet material path through said processor, each of said cells being connected to adjacent cells in said stack in a closed manner.

In a further preferred embodiment of the present invention, a method for making a printing plate according to a silver salt diffusion transfer process, said method comprising the steps of: exposing imagewise an imaging element comprising in the order given (i) a hydrophilic support, (ii) an image receiving layer containing physical development nuclei and (iii) a silver halide emulsion layer; processing said imagewise exposed element through a processor, said processing step including the steps of developing said imagewise exposed element using an aqueous alkaline processing solution in the presence of at least one developing agent and at least one silver halide solvent to obtain a silver image on said hydrophilic support; removing said silver halide emulsion layer and any optional layer on top of said silver image to uncover said silver image by washing with an aqueous medium; guiding said imaging element through a plurality of cells mounted one above the other in a stack to define a substantially vertical sheet material path through said processor, each of said cells being connected to adjacent cells in said stack in a closed manner.

In still another preferred embodiment of the present invention, the method further comprises a finishing step for treating the processed imaging element with a finisher to make the image areas oleophilic (ink-receptive) and non-image areas more oleophobic (ink-repellant).

Also included within the scope of protection of the present patent application is a lithographic printing plate obtained in an apparatus or by a method according to the present invention.

Further Applicability of the Present Invention

In view of the large number of advantages (see next paragraph) of the present invention, it may be emphasized that the present invention also protects a large number of further applicabilities.

Summarising several advantages of the present invention, it may be repeated that the present invention provides a novel and improved image recording apparatus, which occupies only a fraction of the floor space occupied by a horizontal arrangement, with a simplified and shortened transport mechanism, with an integrated wet processor wherein the sheet transport path is substantially straight, with an increased reliability (because of fewer moving parts and straight processing path), with an increased productivity (because the proposed workflow allows the operator to focus on outputting more jobs, not on carrying imaging elements or cassettes to the apparatus). Moreover, the attendant who is stationed at the inlet where successive imaging elements enter the system is capable of monitoring the outlet because the latter is located at the same side as the inlet.

Vareous modifications will become possible for those skilled in the art after receiving the teachings of the present disclosure without departing from the scope thereof. For a good understanding of possible further applicabilities of the present invention, some exemplary modifications are indicated hereinbelow.

First, on a former page it was already stated that it is immaterial whether the first treating unit receives imaging elements from above or from below.

Next, it might be clear that an apparatus according to the present invention may be used as well for imaging elements comprising separate photographic sheets as well as for imaging elements comprising photographic rolls or webs.

Next, also included within the scope of protection is an exposing part without use, or even without presence of any punching and/or any cutting system.

Further, it is evident that in some cases only an exposing part or only a processing part according to the present invention may be used, or that an imaging element optionally might be exposed in a separate imagesetter. Such cases could be carried out due to circumstances of a preventive maintenance of one part of the system, to a curative maintenance (or repair) of one part of the system, to image signals received from a socalled "host imagesetter" or even from a "camera exposer" or from a "contact exposer", etc.

Next, optionally, the system even can easily go back and forth between cassette operation and on-line operation. Amongst others, the processing part has a special receptacle to also take a cassette directly from any other exposing part or imagesetter. Also, in the rare event that the processing part fails, the system still can continue to output jobs to cassette for manual processing or for processing on other machines.

Of course, depending on the choice of the actual type of a specific imaging element, a suitable chemistry has to be applied, as it was indicated in the experiments relative to LITHOSTAR (e.g. G5000B and G5300B) and SUPERMASTER (e.g. G260 and G360); or e.g. G101 and G333 for Agfa ZHN imagesetting film or paper.

A still further advantage of the present invention comprises the fact that, by integrating an exposing part and a processing part within one and same handling system, only one controlling system may be sufficient, thus further reducing costs and increasing the reliability of the system. From this point of view, reference may be given to e.g. EP-A-95.200.883.7 (in the name of Agfa-Gevaert) which describes a diagnosing method to find the cause of a problem of bad performance of a printing plate, and to EP-A-95.200.884.5 (in the name of Agfa-Gevaert) which describes a method for remotely monitoring and optionally adjusting operation of a lithographic printing plate processor.

It is a further great advantage of the present invention that it may be used in different technical fields of applications. As examples, but non-limitative to the scope of protection, hereabove, described were embodiments for an electronic prepress system using a web mounted imaging element, as e.g. s DTR recording substrate (cfr. FIGS. 6 & 7); embodiments for making a lithographic printing plate using an intermediate photographic film (cfr. AGFASTAR), using a camera exposure directly on a printing paper or film (cfr. SUPERMASTER) , using a computer directly on an aluminium plate (cfr. LITHOSTAR) or using a computer directly on paper or film (cfr. SETPRINT); etc. Other technical fields, as X-ray filming or as photoprinting (e.g. socalled "minilabs" for exposing and printing negative films by use of an Agfa MSC-multi-scanning-compact printer) are also covered by the present invention.

While presently preferred embodiments have been described in detail, as will be apparent with those familiar with the art, certain changes and modifications still can be made without departing from the spirit and scope of the invention as defined by the following claims.

We claim:

1. A method for recording an image, said method comprising the steps of (i) exposing an imaging element in an imagesetter, and (ii) processing said imaged element in a processor, such that said imaging element is guided automatically first throughs aid imagesetter, and then through said processor, said processing step further comprising the step of guiding said imaging element through a plurality of cells mounted one above the other in a stack to define a substantially vertical sheet material path through said processor, each of said cells being connected to adjacent cells in said stack in a closed manner.

2. A method for making a printing plate according to a silver salt diffusion transfer process, said method comprising the steps of:

exposing imagewise an imaging element comprising in the order given (i) a hydrophilic support, (ii) an image receiving layer containing physical development nuclei and (iii) a silver halide emulsion layer;

processing said imagewise exposed element through a processor, said processing step including the steps of:
  developing said imagewise exposed element using an aqueous alkaline processing solution in the presence of at least one developing agent and at least one silver halide solvent to obtain a silver image on said hydrophilic support;

removing said silver halide emulsion layer and any optional layer on top of said silver image to uncover said silver image by washing with an aqueous medium;

guiding said imaging element through a plurality of cells mounted one above the other in a stack to define a substantially vertical sheet material path through said processor, each of said cells being connected to adjacent cells in said stack in a closed manner.

3. An apparatus for exposing and processing imaging elements comprising:

an imagesetter for imagewise exposing said imaging elements; and a processing part for wet processing said exposed imaging elements, said exposed imaging elements being fed automatically from said imagesetter into said processing part, said processing part comprising a plurality of cells mounted one above the other in a stack to define a substantially vertical sheet material path through said processing part, each of said cells being connected to adjacent cells in said stack in a closed manner.

4. The apparatus according to claim 3, wherein said apparatus achieves an efficiency ratio of at least 10 per hour, said efficiency ratio being defined as a system throughput of processed imaging elements expressed in square meters per hour, over a ground area occupied by said apparatus expressed in square meters.

5. The apparatus according to claim 4, wherein said system throughput of processed imaging elements is defined at a resolution of 1,200 dots per inch.

6. The apparatus according to claim 3, wherein said processing part comprises means for developing said imaging elements.

7. The apparatus according to claim 6, wherein said processing part further comprises means for fixing said imaging elements.

8. The apparatus according to claim 6, wherein said processing part further comprises means for washing said imaging elements.

9. The apparatus according to claim 6, wherein said processing part further comprises means for drying said imaging elements.

10. The apparatus according to claim 3, wherein said imaging elements comprise photographic film.

11. The apparatus according to claim 3, wherein said imaging elements comprise photographic paper.

12. The apparatus according to claim 3, wherein said imaging elements are lithographic printing plate precursors.

* * * * *

UNITED STATES PATENT AND TRADEMARK OFFICE
CERTIFICATE OF CORRECTION

PATENT NO.  : 5,771,090
DATED       : June 23, 1998
INVENTOR(S) : Verlinden, et al It is certified that error appears in the above-indentified patent and that said Letters Patent is hereby corrected as shown below:

Column 1, line 5, "INVENTION" should read -- THE INVENTION --;

Column 4, line 55, "encoding-and-coding" should read -- encoding-and-decoding --;

Column 7, line 32, "herin" should read -- herein --;

Column 7, line 33, "apparatus" should read -- Apparatus --;

Column 9, line 42, "there" should read -- there- --;

Column 13, line 42, "thereof" should read -- thereof. --;

Column 14, line 2, "there-between" should read -- therebetween --;

Column 14, line 18, "there-between" should read --therebetween--;

UNITED STATES PATENT AND TRADEMARK OFFICE
CERTIFICATE OF CORRECTION

PATENT NO. : 5,771,090
DATED : June 23, 1998
INVENTOR(S) : Verlinden, et al

It is certified that error appears in the above-indentified patent and that said Letters Patent is hereby corrected as shown below:

Column 14, line 31, "gas-and" should read -- gas- and --;

Column 16, line 21, "FIGS.1" should read -- FIGS.11 --;

Column 20, line 49, "throughs aid" should read -- through said --.

Signed and Sealed this

Ninth Day of November, 1999

Q. TODD DICKINSON

Attest:

Attesting Officer

Acting Commissioner of Patents and Trademarks